3,804,802
THERMOPLASTIC COMPOSITES WITH LOW ALKALI GLASS FILLERS

Horacio Enrique Bergna, Wilmington, Del., assignor to E. I. du Pont de Nemours and Company, Wilmington, Del.
No Drawing. Continuation-in-part of abandoned application Ser. No. 119,843, Mar. 1, 1971. This application Jan. 27, 1972, Ser. No. 221,411
Int. Cl. C08f 45/10; C08g 51/10
U.S. Cl. 260—42.16                10 Claims

ABSTRACT OF THE DISCLOSURE

Adhesion between certain thermoplastic resins and low alkali glass filler materials such as borosilicate or aluminosilicate glass is enhanced by treatment of the filler material, prior to forming a composite with the resin, with a solution of a chromium (III) compound belonging to the following group: chromium nitrate, olated chrominum nitrate, complexes of chromium nitrate and olated chromium nitrate with fumaric acid or substituted fumaric acids, and basic chromium chloride in the presence of nitrate ions. Composites made from thermoplastic resins and such treated filler materials have a very high flexural strength and are resistant to degradation by hot water.

RELATIONSHIP TO OTHER APPLICATIONS

This application is a continuation-in-part of U.S. application Ser. No. 119,843, filed Mar. 1, 1071, now abandoned by the same inventor.

BACKGROUND OF THE INVENTION

This invention relates to novel composites constituted of borosilicate or aluminosilicate glass fibers and certain thermoplastic resins, the composites having high flexural strength and good resistance to water. This invention further relates to a process for making such glass fiber-resin composites and, especially, to methods for enhancing the bonding strength between borosilicate or aluminosilicate glass fibers and other mineral fillers and certain thermoplastic resins.

In the application of Alden J. Deyrup, Ser. No. 25,097, filed Apr. 2, 1970, and assigned to the assignee of the present invention, which was copending with the parent of the present application, there are disclosed certain complexes of trivalent chromium compounds with fumaric acid and substituted fumaric acids, such complexes being useful adhesion-promoting agents for bonding various substrates to thermoplastic polymers. One of these complexes, designated "Complex I," is represented by the approximate formula $[Cr(H_2O)_5(C_4H_3O_4)](NO_3)_2$; another complex, "Complex II" is represented by the approximate formula $[Cr(H_2O)_4(C_4H_2O_4)]NO_3$. Solutions of Complex I are said to be most useful for nonmetal substrates, such as glass, while solutions of Complex II are said to have little utility for ordinary glass substrates but are useful for base metal and metal oxide substrates. These two complexes will be hereinafter referred to as Type I and Type II, respectively. Application Ser. No. 25,097 was abandoned in favor of application Ser. No. 119,608, filed Mar. 1, 1971, which in turn was abandoned in favor of application Ser. No. 210,833, filed Dec. 22, 1971. Belgian Pat. 75,137, granted Oct. 1, 1971, generally corresponds to application Ser. No. 119,608.

Only one example, Example 4, of the above Deyrup application discloses application of a chromium complex to glass and bonding of a polyolefinic material to it. In that case, soda lime glass rectangles were treated with Type I, then bonded to specially purified polyethylene film strips containing 5% high surface alumina. Untreated soda lime glass laminates with polyethylene/alumina were delaminated after a few minutes immersion in water at 25° C. Treated laminates did not delaminate in ten days.

No successful attempt to make composites of thermoplastic resins with borosilicate or aluminasilicate glass fibers treated with a fumarato chromium nitrate complex has been reported in the past. Composites of borosilicate glass fibers with thermosetting resins are known. They have been made in the past by treating the glass fibers with an organosilane coupling agent and bonding the pretreated fibers to the resin. A methacrylato chromium chloride complex also has been used in the past to promote the adhesion of borosilicate glass fibers to thermosetting resins, such as various commonly used polyester resins. Yet, thermoplastic resin composites with borosilicate glass fibers, whether bonded with organosilanes or with the methacrylato chromium chloride complex, lose a significant portion of their flexural strength on exposure to water.

Glass fiber reinforced thermosetting resins have found extensive application in the manufacture of boats, specialty vehicles, and in aerospace applications. Similarly, reinforced thermoplastic resins would be very desirable because of their relatively low price and ease of fabrication. There is a need, therefore, for borosilicate or aluminosilicate glass-thermoplastic composites having a high flexural strength and able to maintain their high strength even after a prolonged exposure to water.

SUMMARY OF THE INVENTION

According to this invention, it has now been discovered that excellent composites of borosilicate or aluminosilicate glass fibers and thermoplastic resins can be made by a process comprising the step of treating the glass fibers with a Cr (III) nitrate compound, which can be a carboxylic acid complex having a nitrate anion, chromium (III) nitrate, an "olated" chromium (III) nitrate, or a mixture of basic chromium (III) chloride with nitric acid or a water-soluble nitrate. The preferred compositions are complexes of fumaric acid or a substituted fumaric acid with "olated" chromium nitrate. The nitrate anion is essential to the coupling activity of these compositions. The thermoplastic resins suitable in the preparation of the laminates of the present invention include polyolefins, nylons, fluoroplastics, polyvinyl butyrals, polycarbonates, polysulfones, polystyrenes, styrene-acrylonitrile copolymers (SAN) and acrylonitrile-butadiene-styrene terpolymers (ABS). The preferred thermoplastics are polyethylene and polypropylene.

The glass fibers are treated wih an aqueous solution of the chromium nitrate composition, containing about 0.05–0.2 weight percent of chromium; the treated fibers are allowed to dry, and are admixed with an appropriate thermoplastic resin; and the resulting composition is heated, preferably under pressure, to a temperature sufficient to cause the resin to flow. The temperature and pressure are maintained for a period of time sufficient to allow the molten resin to fill all the voids in the glass fiber substrate.

DETAILED DESCRIPTION OF THE INVENTION

All the chromium coupling agent compositions useful in the process of the present invention contain nitrate anions. While the mechanism whereby the nitrate anions contribute to improved strength of thermoplastic/glass fiber composites is not well understood, it is well known that the nitrate ions always remain outside the chromium (III) coordination sphere; and it appears possible that they react with thermoplastic polymers, forming reactive groups which can then bond to the chromium.

It appears that "olated" chromium (III) nitrate complexes having higher ionic charge and greater physical contact with the glass fiber, bond more strongly to the glass than do the monomeric species. The fumaric acid complexes of chromium (III) nitrate, which are the preferred coupling agents, will generally be mixtures of several species, some of which can be represented by the following formulas wherein Fu stands for the fumaric acid moiety

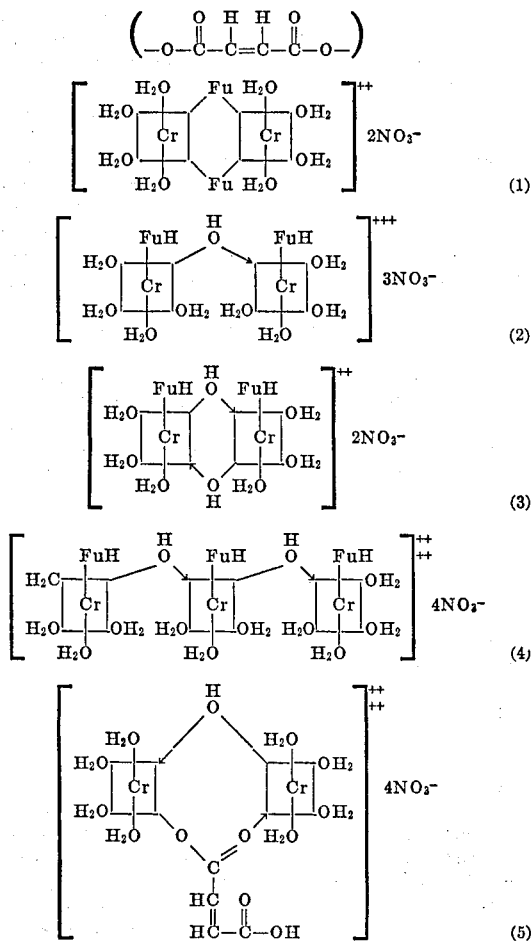

In the above Formulas 2, 3, 4, and 5, two or more chromium atoms are connected by oxygen bridges formed by hydroxyl groups. Such structures are known as "olated" compounds.

In general, some monomeric chromium (III) complex will also be present, even in highly olated material. Monomeric chromium (III) complex can be represented as follows:

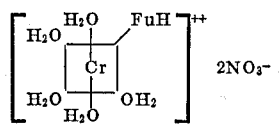

Similarly, basic species such as:

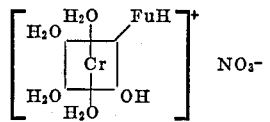

may also be present, particularly if base is added or if nitrate ions are removed by ion exchange.

It will be appreciated that the ratio of carboxylic acid to chromium is not limited to 2, 1, or 0.5, but may vary over the entire range. It is generally preferred that the fumaric acid to chromium molar ratio is between 1:1 and 1:2.

Type I and Type II complexes containing nitrate anions can be made, according to the Deyrup disclosure, by heating in an aqueous solution at 70–100° C. a hexaaquochromic salt, e.g., $Cr(H_2O)_6^{3+}3NO_3^-$, with fumaric acid or with a water-soluble fumarate salt at a pH of about 0.2 to 1 for Complex I or at a pH of above 1 to 2.4 or 3.0 to 4.5 for Complex II. In either case, heating can be carried out in several stages, each time adjusting the pH to an increasing intermediate value.

Type III complexes suitable for the purpose of the invention can be made as deescribed by West (Case 4324-G) in Ser. No. 211,104, filed Dec. 22, 1971, now Pat. 3,725,448, issued Apr. 3, 1973, and assigned to the assignee of the present application. In this process a mixture of chromium (III) nitrate, alkali and the carboxylic acid is heated in an aqueous medium.

Olated complexes, hereafter referred to as Type A complexes, are prepared most conveniently by adding chromium nitrate to an alcohol such as isopropyl alcohol and adding fumaric acid to the resulting solution. The olation takes place spontaneously in the alcohol. Alternatively, the preparation can start with a concentrated aqueous solution of chromium trioxide, which is added to an alcoholic solution of nitric acid where it is first reduced to Cr (III) nitrate by the alcohol. Solutions of Deyrup's Type I and Type II complexes may contain a proportion of olated material. In all cases, a substituted fumaric acid, such as aconitic or mesaconic, can be used instead of fumaric acid.

Commercially available chromium (III) nitrate nonahydrate also is an effective coupling agent in the process of this invention, although not as effective as olated chromium nitrate or as the preferred fumaric acid complexes of chromium (III) nitrate.

Olated chromium (III) nitrate, e.g., having OH bonds as shown in Formulas 3 and 4, above, but containing an average of from 3 to 10 chromium atoms per polymer ion where the fumaric groups are replaced with water, is nearly as effective as the preferred fumaric acid complexes. The olated chromated nitrate can be prepared by the procedure described above for Type A complex, except that the fumaric acid is not added.

Other anions can optionally be present in addition to the nitrate anion. These generally do not impart any improvement in strength but may be desirable for other reasons. For example, basic chromium (III) chloride,

which is an intermediate in the preparation of commercially available chromium complexes, is an effective coupling agent for thermoplastic resins in the presence of nitrate ions. Generally, one to three moles of nitric acid per chromium atom are satisfactory. Lesser amounts of nitric amounts show no further improvement. The preferred compositions contain approximately two nitrate ions per chromium atom. Carboxylic acids can be added to the basic chromium chloride-nitric acid compositions.

Other carboxylic acids can be added to the olated chromium (III) nitrate in place of fumaric acid and substituted fumaric acids. These compositions are less effective coupling agents than the fumaric acid complexes. Representative carboxylic acids include gallic, p-phenoxyacetic, succinic, terephthalic, cinnamic, acrylic, acetylenedicarboxylic adipic, and monoethyl fumarate.

Glass fibers useful in the process of this invention can be any glass fibers low in alkali metal oxides, such as borosilicate and aluminosilicate. The commercial type of borosilicate glass fibers used in the manufacture of glass fiber-reinforced polyester resins are satisfactory.

A particularly useful glass fiber is the "Type E" fiber. This type of glass is described, for example, in Kirk-Othmer's Encyclopedia of Chemical Technology, 2nd ed., vol. 10, Interscience Publishers Div. of John Wiley & Sons, 1966, pp. 533–604; and in Handbook of Fiberglass and Advanced Plastics Composites, Van Nostrand Reinhold Co., New York (1969), pp. 150–152. The glass contains about 54.0% $SiO_2$, 14.0% $Al_2O_3$, 10.0% $B_2O_3$, 4.5% MgO and 17.5% CaO (Kirk-Othmer, Table 3, pp. 542 and 543). By comparison, the ordinary soda-lime glass has 72% silica, 15% soda, 10% lime and magnesia, 2% alumina, and 1% miscellaneous oxides (ibid., p. 541). The ordinary glass thus is much more strongly alkaline than the borosilicate glass.

Another useful glass fiber is the "Type S" fiber. This type of glass is described, for example, on p. 152 of the above-mentioned handbook. The composition of "S" glass by weight is: 65% $SiO_2$, 25% $Al_2O_3$, 10% MgO.

The glass fibers can be used either in the form of a woven glass fiber fabric or yarn or as chopped strand, continuous strand, loose tow, batt, mat or other commercially available forms.

The thermoplastic resins which can be used in the present process include polyolefins such as polyethylene and polypropylene, fluoroplastics such as poly(tetrafluoroethylene), polyamides such as nylon 66 or nylon 6, polyvinyl butyral, polycarbonates, polysulfones, polystyrenes and styrene copolymers and terpolymers such as acrylonitrile-butadiene-styrene (known as ABS) or styrene-acrylonitrile (known as SAN). The most remarkable results are obtained with polyolefins. Commercial grade resins are satisfactory and it is not necessary either to subject such resins to purification or to add alumina or other materials to obtain high bond strengths. However, special purification does improve the wet strength retention. Both high and low density linear polyethylenes, as well as low density ethylene/butene-1 copolymers are suitable.

Novel composites of the present invention can be made by several techniques, including extrusion compounding of resin with chopped continuous strand glass roving and lamination of alternate layers of glass fabric or mat and resin.

The glass fibers or fabric normally will be treated with an aqueous solution of the coupling agent, allowed to dry without rinsing, combined with the thermoplastic resin, and formed into the desired shape. The aqueous solutions of chromium coupling agents have a pH generally within the range of about 2–3.5 although Type A can be used effectively at a pH up to 5; these solutions may contain other ingredients, such as sizes or organic solvents. The chromium concentration in a glass-treating solution is 0.05–0.2 weight percent. The wet pick-up for glass fabric is normally about 100% of dry fabric weight, of which about half is retained after wringing. In the case of borosilicate glass fibers, the chromium concentration is so chosen that about 1–10 mg. of chromium per square meter of total glass fiber surface is retained on the fibers after drying. The preferred concentration is about 3–5 mg./m.$^2$. The surface area of borosilicate glass fibers is most commonly 0.1 to 0.2 m.$^2$/g., as determined by nitrogen or krypton adsorption, using known methods, such as that described by A J. Rosenberg, in J. Am. Chem. Soc., 78, 2929 (1956).

In addition to improving the bonding strength of glass fibers to thermoplastic resins, the chromium compounds useful in the process of the present invention also improve the wetting of the polymer onto the reinforcing component. This is especially true of "E" glass fiber-polyethylene composites, which can be readily prepared by hot pressing of alternate layers of treated glass fibric and polyethylene resin.

Many variants of the invention are possible, as will be readily apparent to one skilled in the art. It is obvious for instance, that the chromium (III) nitrate complexes with carboxylic acids do not have to contain stoichiometric amounts of said acids, and that slightly more and especially less than one mole of the acid per mole of the chromium nitrate can be used. As little as one-half mole of carboxylic acid per mole of chromium nitrate is essentially as effective as the 1:1 ratio, and is more stable.

This invention is now illustrated by certain representative examples thereof, wherein all parts, proportions, and percentages are by weight unless otherwise indicated.

EXAMPLE 1

This is an example of the fabrication of a polyethylene-E-glass fiber fabric laminate consisting of about 64 weight percent glass (40 volume percent) and 36 weight percent polyethylene, using Type I fumarato chromium nitrate complex as coupling agent.

The woven E-glass fabric is a commercial grade Style 181, heat cleaned, Finish 112, available from J. P. Stevens & Co., Inc., 1460 Broadway, New York, N.Y. 10018. The specifications for Style 181 fabric are: 57 x 54 count; 225 ⅓ warp yarn; 225⅓ fill yarn; satin weave; 8.90 oz./sq. yd. nominal weight; 0.0085 in. nominal thickness.

The polyethylene resin in the form of pellets is commercially available at Alathon® 7050 grade from E. I. du Pont de Nemours and Company.

The Type I fumarato chromium nitrate complex is in the form of a solution containing 1.48% Cr and is prepared as follows:

In a total volume of 210 ml. an aqueous solution is made of 40.0 g. chromium (III) nitrate, $Cr(NO_3)_3 \cdot 9H_2O$, and 23.20 g. fumaric acid. The solution, initially at pH 2.3, is held 20 minutes at 100° C., then cooled to 24° C. The pH, resulting from the initial reaction, is 0.29. To this is added with stirring 22.0 ml. of a 0.998 normal solution of ammonium bicarbonate, $NH_4HCO_3$, raising the pH to 0.37. The solution is held at 100° C. again for 30 minutes, then cooled to 24° C., resulting in a pH of 0.29. To this is added 18.0 ml. of the 0.998 normal ammonium bicarbonate solution, raising the pH to 0.38. The solution is held again at 100° C. for 30 minutes, then cooled to 24° C., resulting in a pH of 0.37. To the solution is then added 10.0 ml. more of the 0.998 normal ammonium bicarbonate solution, raising the pH to 0.40. The solution is again held at 100° C. for 50 minutes, then cooled to 24° C., resulting in a pH of 0.29. This completes the heating phases. To the solution is then added 96.1 ml. of a 0.998 normal ammonium bicarbonate solution, raising the pH to 2.20, in order to stabilize the solution. The solution is chilled to 3–5° C. and filtered to remove excess fumaric acid.

Sixty-seven and six-tenths milliliters of the above Type I Cr complex is diluted with 932.4 milliliters of distilled water to complete a total volume of one liter. The pH of the solution obtained is 2.4, and it is adjusted to pH 3 with a 1 M solution of sodium bicarbonate. This final solution is referred to as the coupling agent solution.

Preparation and treatment of glass fabric

Two 38" long, 6" wide strips of glass fabric are cut from a roll in the fill direction, weighed and soaked in the coupling agent solution for about 5 minutes. The strips are next passed through a wringer with roller tension adjusted to give a wet pickup of approximately 50%. Wet pickup is measured by reweighing the strips.

Each strip is then placed on clean cheesecloth, dried for 1 hour at 125° C. and cut into six 6" x 6" panels. The twelve resulting panels are frayed approximately ¼" on each edge, by removing threads parallel to the edge. The dry, treated glass fabric is analyzed by atomic absorption spectrophotometry and found to contain 0.05 weight percent chromium. The total surface area of the glass fabric, determined by nitrogen adsorption prior to the treatment with the coupling agent, is 0.12 m.$^2$/g. The add-on of the coupling agent thus is such that 4.2 mg. of chromium is added per square meter of the glass fibers.

Preparation of polyethylene powder

Alathon® 7050 polyethylene pellets are mixed with an equal weight of Dry Ice and milled through a Wiley mill, then dried in an air oven at 100° C. for four hours. Dry Ice is used to prevent undue rise of temperature during milling because hot polyethylene resin turns gummy and becomes impossible to mill. A fine, dry polyethylene powder is thus obtained.

Fabrication of the laminate

Thirty-nine grams of the polyethylene (PE) powder are divided into thirteen 3 g. fractions. The first 3 g. fraction is spread evenly at the bottom of the cavity of a 6" x 6" steel die. A 6" x 6" treated glass panel is placed flat on top of the PE powder layer, and a second 3 g. fraction of PE powder is in turn spread evenly on top of the glass panel. The operation is repeated until a PE-glass sandwich made up of twelve layers of glass panels alternating with layers of PE powder is assembled inside the steel die. The last 3 g. fraction of PE powder is then spread evenly on the top glass panel.

The steel die thus loaded is placed in a heated press and firm pressure, enough to hold the multilayer sandwich in position, is applied. The press is then heated to 175° C., and pressure is applied at a rate of about 160 p.s.i. per minute until 830 p.s.i. total pressure is reached. The material is held at 830 p.s.i. of pressure, and 175° C. for 2 minutes. At the end of this period, the press is allowed to cool to room temperature, and during this time the pressure drifts down to about 400 p.s.i. Pressure is then released completely, and the die is unloaded.

A 6" x 6" x ⅛" dense, rigid, light green, translucent laminate is obtained in this manner.

Measurement of flexural strength (modulus of rupture)

The laminate is clamped onto the reciprocating table of a precision type hydraulic feed, horizontal spindle, surface grinder (Number 250, Gallmeyer and Livingston, Grand Rapids, Mich.). It is sliced into test bars, 6" x ½" x ⅛" using a 5" diameter resin-bonded diamond cutting wheel (ASD100S-R75B56-⅛, Norton Co., Worcester, Mass.). The cutting conditions are: cutting speed, 3700 s.f.m.; table speed, 92 s.f.m.; and downfeed, 0.0009" per pass. After cutting, the edges of the test bars are lightly sanded.

The flexural strength is measured using a modified form of Federal Specification L-P-406b, Method 1031, Sept. 27, 1951. The modifications consist of a higher crosshead speed of 1.2 inch/min. instead of the specified 0.20 to 0.25 inch/min., and a 0.125-inch thick test bar instead of the specified 0.5 to 0.25-inch thick bar. Tests using the higher and the specified cross head speeds gave similar results and the higher speed was adopted to accelerate the procedure.

Five bars are tested as cut from the laminate, and four bars are tested after being submerged into boiling water for two hours. The average values obtained are referred to as "dry" and "wet" flexural strength (modulus of rupture), respectively. Additional "E" glass fiber-polyethylene laminates are prepared in the same manner, except that either no coupling agent or a prior art commercial coupling agent is used. The results are presented below in Table I-A.

TABLE 1-A

| Coupling agent | Flexural strength, 10³ p.s.i. | | |
|---|---|---|---|
| | Dry | Wet | Percent retention |
| None | 15 | 8 | 55 |
| A-1100 silane | 18 | 13 | 75 |
| Volan® | 19 | 15 | 80 |
| Type I Cr fumarate | 45 | 43 | 96 |

Other properties of the composites made with Type I chromium fumarate are shown in Table 1-B.

TABLE 1-B

| Property tested | Test result | Testing |
|---|---|---|
| Flexural strength at 23° C., p.s.i. | 45,000 | L-P-406b |
| Tensile strength at yield, 23° C., p.s.i. | 38,000 | D-638-68 |
| Tensile modulus at 23° C., p.s.i. | 2,100,000 | D-638-68 |
| Elongation at 23° C., percent | 2.2 | D-638-68 |
| Stiffness, p.s.i. | 1,870,000 | D-747-6B |
| Izod impact strength at 23° C., notched, ft.-lbs./in. | 14 | D-256-56 |
| Deformation under load (50° C., 2,000 p.s.i., 24 hrs.), percent | 0.2 | D-621 |
| Deflection temperature under load, ° C.: | | |
| 73-80 p.s.i. | 132 | D-648 |
| 264 p.s.i. | 132 | D-648 |
| Rockwell hardness, R scale | 107 | D-785 |

NOTE.—D tests: ASTM, L-P test: U.S. Government specification.

A-1100 silane is an amine-type vinyl silane available from Union Carbide Corporation, Chemicals & Plastics, 270 Park Ave., New York, N.Y. 10017. A 1% solution of A-1100 silane in water was used and the pH was adjusted to 4 with dilute acetic acid.

The "E" glass fabric was dipped into the 1% A-1100 silane solution at pH 4 for 5 minutes, wrung and dried at 125° C. for one-half hour.

Volan® bonding agent is a Werner type compound in which methacrylic acid is coordinated with basic chromium chloride. Volan® is supplied as a solution in isopropyl alcohol by the Industrial and Biochemicals Department of E. I. du Pont de Nemours and Company. A 2% solution of Volan® in water was used and the pH was adjusted to 6 with dilute NH₄OH. In the case of the control runs with A-1100 silane and Volan®, the dried, treated glass fabric is washed by immersion in water for 2 to 3 minutes and then dried at 125° C. for one-half hour.

EXAMPLE 2

"E" glass-polyethylene laminates are made in the same manner as in Example 1, except that other fumarato chromium (III) nitrate complexes, namely Type II and Type A, are used. Type II is prepared as follows:

In one liter of total aqueous solution are placed together 20.0 g. chromium (III) nitrate, $Cr(NO_3)_3 \cdot 9H_3O$, and 40.0 g. of fumaric acid. The solution is boiled for 1 hour, then cooled to 24° C., resulting in a clear blue solution with pH 1.18. To this is added with stirring 34.0 ml. of a 1.000 normal sodium bicarbonate solution, resulting in a pH of 1.43. The solution is boiled again 1 hour, then cooled to 24° C., resulting in a pH of 1.33. To this is added 33.0 ml. of the 1.000 normal sodium bicarbonate solution, resulting in a pH of 1.63. The solution is boiled again for 1 hour, then cooled to 24° C., resulting in a pH of 1.44. To this is added 33.0 ml. of the 1.000 normal sodium bicarbonate solution, resulting in a pH of 1.84. The solution is boiled 3 hours longer, resulting in a pH of 1.67. It is then cooled to 4–5° C. and filtered to remove excess fumaric acid. The resulting solution has a clear medium green color.

Type A is prepared as described below:

Chromium nitrate nonahydrate (8.0 g., 0.02 mole) is dissolved in 100 ml. of anhydrous ethanol, producing a blue-violet solution, which is allowed to stand at 25° C. for 170 minutes. At the end of this period, the solution is dark green. Fumaric acid (0.02 mole) is then added, producing a dark-blue solution. Conductimetric titration shows that 70% of fumaric acid has reacted. The reaction is completed by addition of 0.02 mole of sodium ethoxide (20 ml. of a 1 N solution).

In the case of Type II and Type A coupling agents, the fabric preparation is the same as in the case of Type I, described in Example I, above.

The rest of the PE laminate fabrication is the same as described in Example I.

The flexural strength determination gave the following results.

TABLE 2

| Type of Cr fumarate complex | Flexural strength, 10³ p.s.i. | | |
|---|---|---|---|
| | Dry [1] | Wet [1] | Percent retention |
| I | 45 | 43 | 96 |
| II | 44 | 42 | 96 |
| A | 42.5 | 42 | 99 |

[1] As determined in Example 1.

It can be seen from the above data that all three chromium (III) complexes are equally good coupling agents for "E" glass fiber laminates with polyethylene.

EXAMPLE 3

In this example, Type A fumarato chromium (III) nitrate complex is compared with Type A complexes of mesaconato and aconitato chromium (III) nitrate complexes, which were prepared in the same manner. Again, "E" glass fiber-fabric-polyethylene laminates were prepared, as in Example 1, and their "dry" and "wet" transverse rupture strengths were determined. The results are presented in Table 3, below.

TABLE 3

| | Flexural strength 10³ p.s.i. | | |
|---|---|---|---|
| Type A Cr (III) complex with— | Dry | Wet | Percent retention |
| Fumaric acid | 42.5 | 42 | 99 |
| Mesaconic acid | 44 | 42 | 96 |
| Aconitic acid | 44 | 38 | 87 |

These data show that substituted fumaric acids are nearly as suitable as the unsubstituted fumaric acid in the preparation of coupling agents for making strong glass fiber/thermoplastic composites.

EXAMPLE 4

Composites of "E" type borosilicate glass fabric with polypropylene, nylon 66, poly(tetrafluoroethylene), and ABS terpolymer as well as other polymers listed in Table 4 were prepared in the same general manner as in Example 1, using Type I chromium (III) coupling agent. The lamination temperatures were adjusted for each polymer to suit its individual rheological characteristics. The experimental details and results are presented in Table 4, below.

obtained. The "A" glass reinforcing mat is a commercial product of Modiglas-Fibers Division, Reichold Chemicals, Inc., P.O. Box 86, Bremen, Ohio, and has the following characteristics: 2¼ oz./ft.², heat treated at 427° C. for 20 hours to burn off the binder. The "E" glass mat is a product of Owens Corning Fiberglas Corporation, 717 5th Ave., New York, N.Y. 10022 and is a continuous strand mat, grade 8609, weighing 2.5 oz. per sq. ft. The mat as received has a silane binder which is removed by burning at 427° C. for 20 hours in an air oven.

Glass fiber-polyethylene laminates are prepared both with and without a Type I coupling agent, as follows:

70 g. of the glass mat treated with Type I chromium (III) coupling agent are cut into 6 inch x 6 inch pieces, and 30 g. of Alathon® 7050 powder is distributed uniformly throughout. The glass mats with the PE powder are hot pressed under the same conditions as used in Example 1 for "E" glass fabric laminates. The flexural strength of the laminates is determined in the same manner as in the case of the preceding "E" glass fabric laminates. The results are presented in Table 5, below.

TABLE 5

| | | Flexural strength, 10³ p.s.i. | | |
|---|---|---|---|---|
| Glass type: | Coupling agent | Dry | Wet | Percent retention |
| A | None | 11 | 8 | 72 |
| | Type I | 17 | 9 | 50 |
| E | None | 12 | 7 | 58 |
| | Type I | 41 | 38 | 93 |

It can be seen readily from the above data that in the absence of a Type I coupling agent the flexural strength of "A" glass laminates is quite low and decreases to 72% of its value after the sample is boiled in water for two hours. In the presence of the coupling agent, the flexural strength increases by 54%, but one-half of the strength is lost during a two-hour boiling period. "E" glass laminates prepared without a coupling agent also have a low dry strength, which decreases to 58% of its value after boiling in water. By comparison, the dry strength of laminates prepared from "E" glass fibers treated with the Type I chromium complex increases by over 240% and only 7% of this high strength is lost by boiling in water. It can be concluded from this

TABLE 4

| Resin | Grade | Glass, weight percent | Coupling agent | Hot pressing conditions | Laminate Flexural strength, 10³ p.s.i. | | |
|---|---|---|---|---|---|---|---|
| | | | | | Dry | Wet | percent retention |
| Polypropylene | Profax® 6601 (Hercules, Inc.) | 65.5 | None | 210° C.–830 p.s.i.–2 min. | 16 | 11 | 69 |
| | | | Type I | | 50 | 45 | 90 |
| Nylon 66 | Zytel® 101 (Du Pont) | 59.75 | None | 270° C.–275 p.s.i.–2 min. | 41 | 22 | 54 |
| | | | Type I | | 65 | 52 | 80 |
| Poly(tetrafluoroethylene) | Teflon® FEP (Du Pont) | 47.2 | None | 300° C.–830 p.s.i.–2 min. | 20 | 8 | 40 |
| | | | Type I | | 28 | 23 | 82 |
| ABS (acrylonitrile-butadiene-styrene) | Cycolac® TD–1001 (Marbon Chemicals.) | 65.8 | None | 230° C.–830 p.s.i.–2 min. | 26 | 15 | 59 |
| | | | Type I | | 27 | 24 | 89 |
| SAN (styrene acrylonitrile) | Tyril® 867 (Dow Chemical Co.) | 59.75 | None | 260° C.–830 p.s.i.–2 min. | 38 | 27 | 71 |
| | | | Type A | | 53 | 51 | 95 |
| Polystyrene | Bakelite® SMD 3500 (Union Carbide Co.) | 65.8 | None | 200° C.–830 p.s.i.–5 min. | 29 | 20 | 69 |
| | | | Type A | | 43 | 39 | 91 |
| Polycarbonate | Lexan® 105–111 (General Electric Co.) | 59.75 | None | 290° C.–830 p.s.i.–1 min. | 60 | 23 | 38 |
| | | | Type A | | 55 | 46 | 84 |
| Polysulfone | Bakelite® P–1700 (Union Carbide Co.) | 60.5 | None | 350° C.–1,100 p.s.i.–5 min. | 61 | 32 | 52 |
| | | | Type A | | 66 | 63 | 96 |
| Polyvinyl butyral | (Du Pont) | 60.5 | None | 240° C.–1,100 p.s.i.–2 min. | 50 | 22 | 44 |
| | | | Type A | | 53 | 38 | 72 |

EXAMPLE 5

In this example, the bonding effectiveness of Type I fumarato chromium (III) nitrate is compared for "E" borosilicate glass and "A" soda-lime glass. "A" glass is a soda-lime glass of the type used for making window glass and bottles. It is described in the above-cited Lubin reference, pp. 152 and 153. "A" glass fiber cloth is not available in the United States, but "A" glass mat can be experiment that chromium fumarate complexes are good coupling agents for borosilicate glass fibers but not for soda lime glass fibers. It can also be concluded that E glass mat, which is much cheaper than E glass fabric, gives PE-glass laminates of almost the same flexural strength.

EXAMPLE 6

This is an example of the fabrication of a polyethylene-"E" glass chopped strand composite consisting of about 30 weight percent glass and 70 weight percent PE, using Type I fumarato chromium nitrate complex as the coupling agent.

The glass fiber is a commercial unsized continuous strand "E" borosilicate glass roving, grade K-861, available from Owens-Corning Fiberglas Corporation, 717 5th Ave., New York, N.Y. 10022

The PE resin in the form of pellets is the same as used in Example 1.

The Type I fumarato chromium nitrate complex solution is also the same as used in Example 1.

Treatment of glass fiber continuous strand roving

The glass strand roving is treated with the Type I solution in a laboratory coater consisting of two Teflon® [Du Pont's poly(tetrafluoroethylene)] bobbins, two Teflon® guides, one Teflon® scraper, and a bath at room temperature. The untreated glass strand roving from one of the Teflon® bobbins is passed through the aqueous solution of Type I containing 0.1% Cr, over the Teflon® on the second Teflon® bobbin, which is driven by an electric motor. The speed of the drive is regulated to give 10 seconds of immersion of the glass strand roving in the Type I bath.

One hundred grams of glass strand roving is treated with Type I fumarato chromium nitrate and wound onto the Teflon® bobbin and the bobbin is then placed in an air oven at 125° C. and allowed to dry for one hour.

Using the above procedure, a second batch of 100 grams of strand roving is treated for comparison with a commercially available silane A-1100 (available from Union Carbide) and rinsed as in Example 1. The treating bath is an aqueous solution containing 1% of A-1100.

Chopping the glass strand roving into chopped strands

After drying, the treated glass strand roving is chopped into ¼" long bundles with a glass roving cutter available from Finn & Fram, Inc., 8402 San Fernando Road, Sun Valley, Calif., using a head with ¼" spacing between knives. The chopper is activated by a Zero-Max Co. variable speed transmission model P2, rotation CW. The glass strand roving is fed from the bobbin to the cutter at about 10 feet per minute.

Preparation of PE-"E" glass chopped strands composite

The PE-"E" glass chopped strands composite is prepared by dispersing the Type I treated chopped strands in PE by roll milling at 160° C. in a Farrell Birmingham, Ansonia, Conn., 6A Milling Roll equipped as follows:

Drive: Master AC ½ H.P. motor
Rolls: Two rolls chrome-plated steel, 6" x 13"
Roll speeds: 33.4 r.p.m. and 23.8 r.p.m. (1.4 speed ratio between the two rolls)
Heating: 82 lbs. steam (boosted steam)
Cooling: Water to both rolls.

Procedure

Two hundred thirty-three grams of Alathon® 7050 pellets are poured between turning rolls at 160° C. and allowed to melt uniformly. One hundred grams of treated chopped glass strand is then fed gradually in a period of 5 minutes into the gap between the rolls. The gap between the rolls is kept as small as the operation permits, to prevent excessive shearing action, which may damage the glass fibers. A cigar-shaped roll of PE glass fibers dispersed in it is formed during this operation along the gap between the turning rolls. The ends of the cigar roll are being put back continuously in the center area to assure good mixing action.

After 15 minutes total time of milling, the material is transferred to a turning cold milling roll having the same specifications and operated at the same speed as the hot roll.

A sheet of uniform material is obtained in this manner, and is removed from the rolls and cut with scissors into 2" squares.

The glass fiber-PE composite obtained in this manner is chopped so that the material passes a ¼" opening screen. An A. H. Thomas, Philadelphia, Pa., Wiley Mill ED-5 is used to chop the material.

The composite material is now ready for fabrication of parts or test samples by injection molding.

Fabrication of test samples by injection molding

A manually operated, one-ounce capacity Watson Stillman injection molding machine is used. Injection molding with this type of machine is well known in the art. Mold types used are heated ⅞" diameter cylinders with a pointed spreader and ⅛" tapered nozzle. Two types are used, one to make Federal Specification L-P-406b, Method 1031 flexural modulus bars, and a second one to make ASTM D-638 tensile strength bars. The extrusion temperature is 175° C. and the cycle used is 25/20, which means that injection of the material is done in 25 seconds and the extrusion nozzle is open for 20 seconds. The injection pressure is about 6000 p.s.i. and the ram speed 50 inch/min.

Five flexural strength specimens (5" x ½" x ⅛") are injection-molded first, then ten tensile strength specimens, and finally seven more flexural bars.

The injection molded specimens of glass fiber reinforced PE are used for tensile strength and stiffness determination as described in ASTM Specifications D-638-68, and D-747-63. Flexural strength is determined by the method described in Federal Specification L-P-406b, Method 1031.

Flexural strength, tensile strength, tensile modulus, ultimate elongation, and stiffness are determined for both types of "E" glass-polyethylene laminates, namely, those using fumarato chromium nitrate as coupling agent and those using the prior art commercial silane. The results are tabulated in Table 6.

TABLE 6

| Physical property determined | Test specification | Coupling agent | Dry | Wet, after 2 hrs. in boiling water | Percent retention |
|---|---|---|---|---|---|
| Flexural strength, p.s.i. | Federal specif., L-P-406b, Method 1031. | A1100 silane | 6,750 | 6,690 | 99 |
| | | Type I Cr(III) complex | 13,300 | 13,400 | 100 |
| | | | | After 1 wk. in boiling water | |
| Tensile strength, p.s.i. | ASTM D-638-68 | A1100 silane | 3,680 | 3,530 | 95 |
| | | Type I Cr(III) complex | 7,340 | 6,680 | 91 |
| Tensile modulus 10⁵ p.s.i. | ASTM D-638-68 | A1100 silane | 7.09 | | |
| | | Type I Cr(III) complex | 8.28 | | |
| Ultimate elongation, percent | ASTM D-638-68 | A1100 silane | 5.0 | | |
| | | Type I Cr(III) complex | 4.9 | | |
| Stiffness, p.s.i. | ASTM D-747-63 | A1100 silane | 273,000 | | |
| | | Type I Cr(III) complex | 340,000 | | |

The foregoing data show that the fumarato chromium nitrate complex gives stronger and stiffer laminates than can be obtained with a silane coupling agent.

EXAMPLE 7

This is an example of the preparation of a PE-"E" glass fiber fabric laminate by a pre-impregnation technique.

The E glass fabric, the coupling agent and the PE used are the same as in Example 1. Treatment of the glass fabric with the Type I fumarato Cr nitrate complex coupling agent is done in the same way as in Example 1.

Impregnation of the treated glass fabric with PE is done by immersing the fabric in a solution of PE prepared by dissolving 100 g. of Alathon® 7050 in 900 g. o-xylene at 110° C.

The glass fabric wound on a roll is passed through the PE solution and wound onto a second roll using the equipment described for treating continuous glass roving, except that in this case the second roll is cranked manually instead of being driven by an electric motor. The PE solution is kept at about 100° C. during the operation to prevent precipitation of the PE since the cold glass fabric tends to cool down the solution.

The glass fabric is passed through the hot solution at a rate such that the fabric remains immersed in the solution for about 5 seconds. A long span is allowed between the bath and the second roll to allow the fabric to air-dry before winding on the roll.

In the first impregnation treatment, the glass fabric picks up about 15% of its weight of PE. A second pass of the glass fabric through the o-xylene PE solution gives a total pickup of about 36% of PE on the glass fabric.

Once the PE-impregnated glass fabric is dry, twelve 6″ x 6″ panels are cut from the dried PE-impregnated glass fabric, and hot pressed using the same conditions as in Example 1, to give a PE-"E" glass laminate of approximate composition, 30 weight percent of polyethylene and 70 weight percent of glass.

The laminate obtained is tested as in Example 1, and gives a flexural strength of 43,400 p.s.i. dry and 44,950 p.s.i. wet.

EXAMPLE 8

Laminates of polyethylene with "E" glass fabric also are prepared with the following chromium (III) coupling agents: chromium nitrate, olated chromium nitrate, basic chromium chloride in the presence of nitric acid, and basic chromium chloride in the absence of nitric acid. A laminate also is made without a coupling agent for comparison. The coupling agents are prepared in the following manner:

(1) Chromium nitrate

Eight grams of chromium nitrate nonahydrate $Cr(NO_3)_3 \cdot 9H_2O$ is dissolved in distilled water, and the solution is diluted to 1000 ml. The concentration of chromium is 0.1%. This solution is used to impregnate the "E" glass fabric.

(2) Olated chromium nitrate (a)

Eight grams of chromium nitrate nonahydrate $Cr(NO_3)_3 \cdot 9H_2$ is dissolved in 50 ml. of anhydrous ethanol and allowed to stand overnight at room temperature to form olated chromium species. Distilled water is added to a total volume of 1000 ml.

1 M $NaHCO_3$ solution is added dropwise to adjust the pH to 3. The "E" glass fabric is treated with this solution containing 0.1% Cr.

(3) Olated chromium nitrate (b)

Eight grams of Cr nitrate nonahydrate is dissolved in 100 ml. of anhydrous ethanol. A solution of 0.8 g. of sodium hydroxide in 50 ml. anhydrous ethanol is added dropwise while stirring. The solution obtained is allowed to stand overnight at room temperature and the precipitated sodium nitrate is removed by filtration.

The clear filtrate is diluted with water to a total volume of 1000 ml. and the pH is adjusted to 3 with 1 M $NaHCO_3$.

The "E" glass fabric is treated with this solution of olated Cr nitrate containing 0.1% Cr.

(4) Basic chromium chloride, $Cr(OH)Cl_2$

This compound can be made by the procedure of Iler (U.S. 2,524,803), which consists in dissolving 5.53 parts of $CrO_3$ in 3.67 parts of water, adding this solution to 13.22 parts of 20 Be hydrochloric acid (31.45% HCl), and running this solution into 23.72 parts by weight of isopropyl alcohol at reflux temperature with good stirring. Refluxing was continued for 30 minutes. Basic chromium chloride is an intermediate in the commercial production of Volan®.

In the experiment with basic chromium chloride in the presence of nitric acid, the glass fabric is treated with a solution which is prepared as follows:

32.2 g. of 8.85% Cr solution of basic chromium (III) chloride in isopropyl alcohol is diluted with 500 ml. of water. A solution of 2.64 ml. of concentrated $HNO_3$ in 50 ml. of water is added to the dilute basic chromium chloride solution and more water is added to complete the total volume to 1000 ml. The pH is adjusted to 3 with a 1 M $NaHCO_3$ solution.

In the absence of nitric acid, the following solution is used:

32.2 g. of a 8.85% Cr solution of basic chromium (III) chloride in isopropyl alcohol is diluted with water to give a total weight of 1000 g. The pH is adjusted to 3 with a 1 M $NaHCO_3$ solution.

The results are tabulated below in table 7.

TABLE 7

| Coupling agent | Flexural strength, $10^3$ p.s.i. | | |
|---|---|---|---|
| | Dry | Wet | Percent retention |
| None | 15 | 8 | 55 |
| Cr nitrate | 38 | 30 | 80 |
| Olated Cr nitrate (a) | 38 | 33 | 87 |
| Olated Cr nitrate (b) | 41 | 39 | 95 |
| Basic Cr chloride plus $HNO_3$ | 42 | 38 | 90 |
| Basic Cr chloride | (¹) | (²) | 45–77 |

¹ Erratic, 16–36.
² Erratic, 9–26.

The erratic results obtained with basic chromium (III) chloride appear to be due to nonuniform wetting of the glass fiber by the polymer.

The above data show that the olated chromium nitrate (b) prepared in the presence of sodium hydroxide, is an excellent coupling agent, and that olated chromium nitrate (a), basic chromium chloride in the presence of nitric acid, and even ordinary chromium nitrate also are very good coupling agents.

EXAMPLE 9

Composites of "E" type borosilicate glass fabric with styrene-acrylonitrile copolymer, Marbon Chemical Co. Blendex 565® powder, are prepared in the same general manner as in Example 1, using Type I chromium (III) coupling agent. The composites, pressed at 250° C. and 830 p.s.i. for 2 minutes, contain 56 weight percent of glass. They are strong and water resistant.

EXAMPLE 10

Glass fiber fabric-polyethene laminates are made in the same manner as in Example 1, except that heat-treated "S" glass fiber fabric is used instead of "E" glass fiber fabric and Type A fumarato chromium (III) nitrate complex is used instead of Type I. Heated-treated woven "S" glass fiber fabric #16811 is available from J. P. Stevens & Co., Inc.

The fabric preparation and the laminate fabrication is the same as described in Example 1.

The laminate obtained is tested as in Example 1 and gives a flexural strength of 48,000 p.s.i. dry and 46,000 p.s.i. wet, which corresponds to 96% retention.

EXAMPLE 11

"E" glass-polyethylene laminates are made in the same manner as in Example 1, except that olated chromic (III) nitrate is used. Olated chromic (III) nitrate is prepared as follows:

Chromium nitrate nonahydrate (8.0 g., 0.02 mole) is dissolved in 100 ml. of anhydrous ethanol, producing a blue-violet solution which is allowed to stand at 25° C. for 170 minutes. At the end of this period, the solution is dark green.

The fabric preparation and the laminate fabrication is the same as described in Example 1.

The laminate obtained is tested as in Example 1 and gives a flexural strength of 43,000 p.s.i. dry and 40,000 p.s.i. wet, which corresponds to 93% retention.

EXAMPLE 12

"E" glass-polyethylene laminates are made in the same manner as in Example 1, except that Type III fumarato chromic (III) nitrate is used. Type III fumarato chromic (III) nitrate is prepared as follows:

Chromium nitrate nonahydrate (46.2 g., 0.116 mole) was dissolved in 38 g. of water. While stirring the solution, 10.9 g. (0.136 equivalent) of 50% aqueous sodium hydroxide were added, keeping the temperature below 40° C. by the use of external cooling. Some solids were observed in the solution at this point. The temperature was then raised to reflux (106° C.) and held there for 15 minutes. The precipitate dissolved and the solution turned green. Fumaric acid (6.7 g., 0.058 mole) was added and refluxing was continued for another 15 minutes. The solution was cooled to 25° C. and filtered to remove a small amount, less than 0.1 g., of insoluble matter. The resulting solution was blue-green and was found by analysis to contain 5.9% chromium. The pH of this solution was 0.06.

The fabric preparation and the laminate fabrication is the same as described in Example 1.

The laminate obtained is tested as in Example 1 and gives a flexural strength of 47,000 p.s.i. dry and 43,200 p.s.i. wet.

What is claimed is:

1. A composite of a thermoplastic resin selected from the group consisting of polyolefins, polyfluoroolefins, polyamides, polyvinyl butyrals, polycarbonates, polysulfones, polystyrenes, styrene-acrylonitrile copolymers, and acrylonitrile-butadiene-styrene terpolymers with a borosilicate or alumino-silicate glass fiber material, said fiber material having on its outer surface a coating of a chromium (III) coupling agent selected from the group consisting of chromium nitrate, fumarato chromium nitrate, aconitato chromium nitrate, mesaconato chromium nitrate, olated chromium nitrate, olated fumarato chromium nitrate, olated aconitato chromium nitrate, olated mesaconato chromium nitrate and their mixtures.

2. A composition of claim 1 wherein the polyolefin is polyethylene or polypropylene.

3. A composition of claim 2 wherein the coupling agent is fumarato chromium nitrate or olated fumarato chromium nitrate.

4. A process for making a composite of a thermoplastic resin selected from the group consisting of polyolefins, polyfluoroolefins, polyamides, polyvinyl butyrals, polycarbonates, polysulfones, polystyrenes, styrene-acrylonitrile copolymers, and acrylonitrile-butadienestyrene terpolymers with a borosilicate or aluminosilicate glass fiber material, said process comprising the following steps:

(a) contacting the glass fiber material with an aqueous solution of a chromium (III) coupling agent selected from the group consisting of chromium nitrate, fumarato chromium nitrate, aconitato chromium nitrate, mesaconato chromium nitrate, olated chromium nitrate, olated fumarato chromium nitrate, olated aconitato chromium nitrate, olated mesaconato chromium nitrate, basic chromium chloride, and their mixtures, said solution containing 0.05-0.2 weight percent of chromium and having a pH of 2-3.5; provided that when basic chromium chloride is used, one to three moles of nitric acid per atom of chromium added as basic chromium chloride also are present in the solution;

(b) drying the fiber material without rinsing;

(c) placing the dry fiber material in contact with the thermoplastic resin; and (d) heating the composition resulting from step (c), above, to a temperature sufficient to cause the thermoplastic resin to flow, while applying external pressure for a period of time sufficient to allow the molten thermoplasic resin to fill all the voids.

5. The process of claim 4 wherein the amount of the coupling agent added in step (a) is such that the chromium concentration on the glass fiber material is 1–10 milligrams per square meter of the total glass fiber surface area.

6. A process of claim 4 wherein the polyolefin is polyethylene or polypropylene.

7. The process of claim 4 wherein the coupling agent is fumarato chromium nitrate or olated fumarato chromium (III) nitrate.

8. A composite of a thermoplastic organic resin and borosilicate or aluminosilicate glass fiber material, said composite being prepared by the process of claim 4.

9. A composite of a polyolefin and borosilicate or aluminosilicate glass fiber material, said composite being made by the process of claim 4.

10. A composite of a polyolefin and borosilicate or aluminosilicate glass fiber material, said composite being prepared by the process of claim 5.

References Cited

UNITED STATES PATENTS

| | | | |
|---|---|---|---|
| 2,825,659 | 4/1958 | Dalton | 117—126 |
| 2,700,010 | 1/1955 | Balz | 154—128 |
| 2,798,891 | 7/1957 | Schaffer | 260—674 |
| 2,611,718 | 9/1952 | Steinman | 117—72 |
| 3,181,324 | 4/1965 | Labino | 72—42 |

OTHER REFERENCES

Erdmann: Raumbeh Vernetzle Chrom III Complexsolze, Das Leder, 17 (1966) 10–16.

Vincent: Bonding Polyethylene to Metals, J. of Applied Polymer Science, II (1967), 1553–62.

ALLAN LIEBERMAN, Primary Examiner

R. ZAITLEN, Assistant Examiner

U.S. Cl. X.R.

117—126 GQ, 126 GF; 260—37 R, 37 N,